United States Patent Office 3,311,916
Patented Mar. 28, 1967

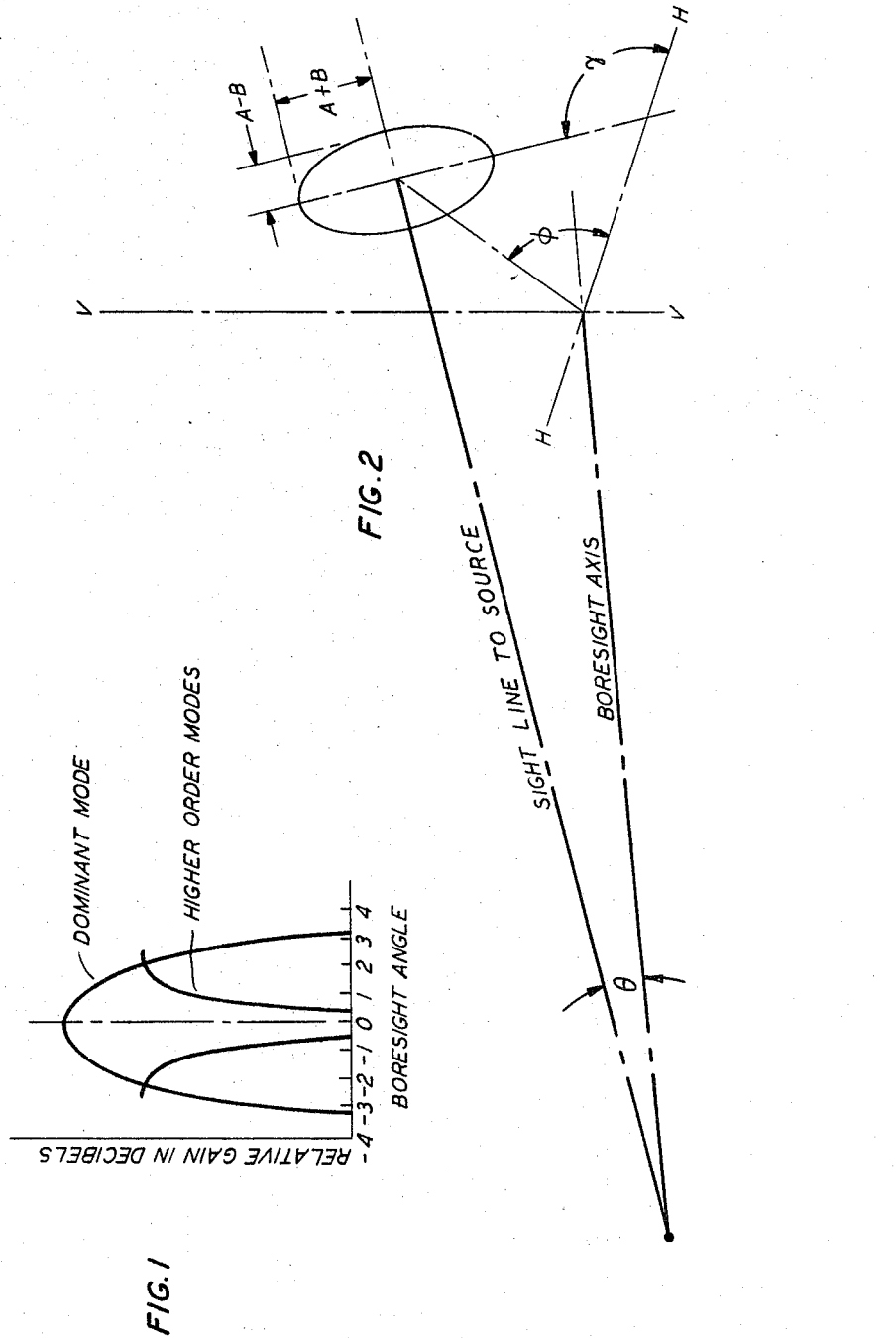

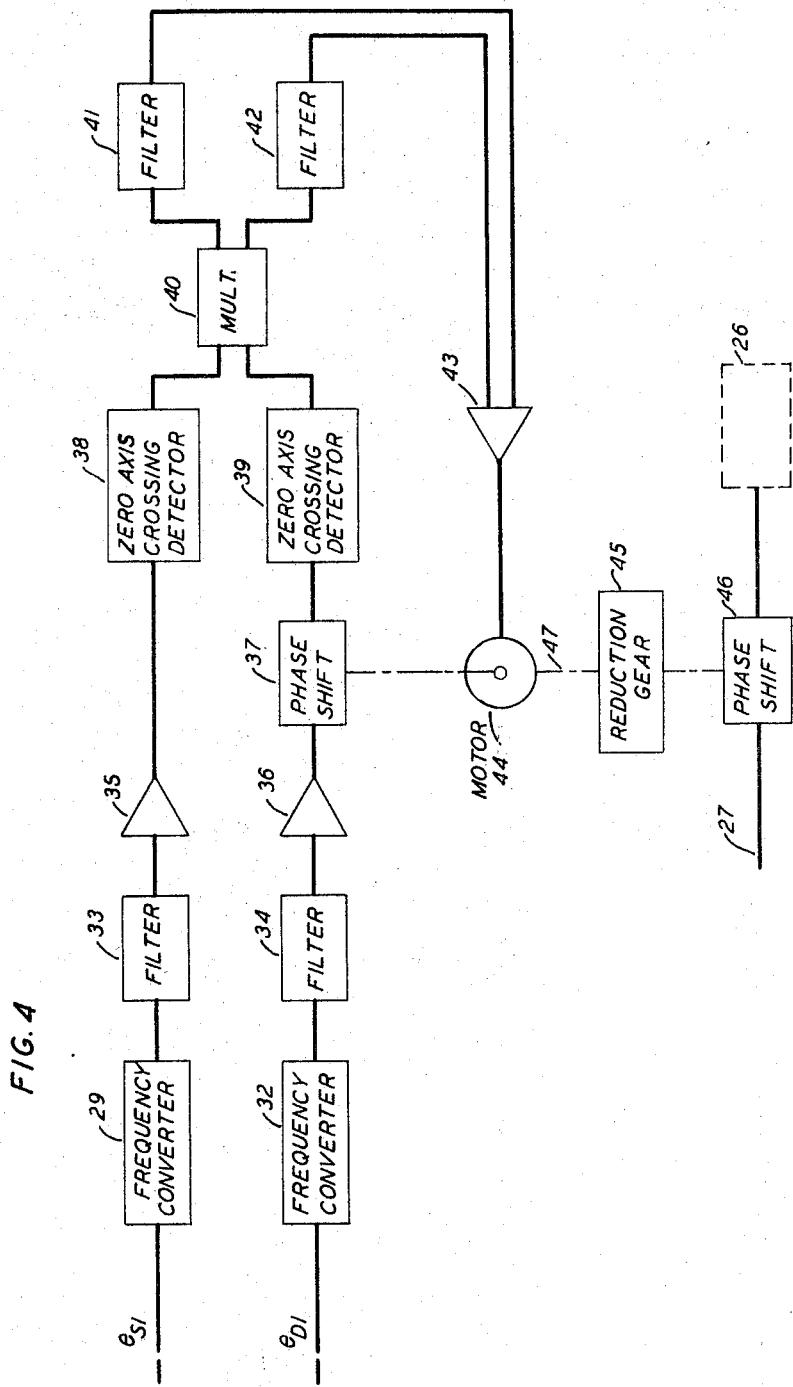

3,311,916
NONDEGENERATE MULTIMODE TRACKING SYSTEM
George N. Packard, Bernardsville, N.J., assignor to Bell Telephone Laboratories, Incorporated, New York, N.Y., a corporation of New York
Filed Oct. 20, 1964, Ser. No. 405,068
16 Claims. (Cl. 343—100)

This invention pertains to simultaneous lobing radar systems and, more particularly, to radar tracking systems in which a plurality of signal modes excited by a polarized microwave signal are analyzed at an antenna station to determine accurately the spatial position of a source or virtual source of signals received at the antenna location.

In simultaneous lobe comparison radar systems, conventionally called monopulse systems, tracking of a target is accomplished by comparing overlapping patterns or lobe signals returned to the antenna, or more commonly a plurality of antennas, and determining from this examination the discrepancy, if any, between the direction the antenna is pointing and the actual direction of the target. The discrepancy is reduced to a set of pointing error signals which may be used either as a vernier correction of the antenna pointing direction or for fully automatic antenna tracking of the target. Preferably, circularly polarized signals are radiated from and received by a single antenna such as a horn used to track the target. A typical system is described in an article entitled, "The Autotrack System," by J. S. Cook and R. Lowell in the Bell System Technical Journal, vol. 42, 1963, part 2, page 1283. With this system, at least two signal modes are sampled in the antenna waveguide feed line and the detected mode signals are separately processed to provide tracking information.

With circular polarization it is customary to employ the two lowest order modes, the $TE_{11}$ or dominant mode, and the $TM_{01}$, first higher order mode, to indicate the antenna's pointing error magnitude and direction. Whenever the signal source or target is off the antenna boresight axis, the $TM_{01}$ mode is excited. Since this mode is not excited when the signal source lies on the boresight axis, the resulting null is indicative of boresight axis and signal source congruence. However, in order for this signal mode characteristic to be useful, it must be measured against a reference. The dominant mode signal serves this purpose. Its utility lies in two specific characteristics: it preserves the polarization of received plane waves, and its amplitude is maximum and nearly independent of pointing error when the error is small.

By utilizing a single higher order mode signal and comparing it with two orthogonal components of the dominant mode signal, positive tracking is possible on signals of either sense of circular polarization. Tracking with this signal processing arrangement presupposes, of course, an active return signal of circular polarization. With reflections from a passive target, however, there is no guarantee that received signals will be polarized such as to yield usable components; linear or elliptical polarization may occur. Thus, unless special precaution is taken, polarization alterations of received signals occasioned by reflection irregularities, or the like, so alter the recovered signals that insufficient data is received to assure positive tracking.

For a signal which is linearly polarized, a pointing error orthogonal to the plane of polarization will not excite radially symmetric electric fields in the antenna aperture. Hence, the $TM_{01}$ mode will not be excited and no error indication will be generated. Whereas for circular polarization the higher order mode pattern has a null point on the antenna axis, for linear polarization there is a plane orthogonal to the polarization direction for which the difference mode is not excited. A tracking system for avoiding this effect of polarization degeneracy and thus insuring that a linearly polarized signal may be unambiguously tracked is described in a copending application of J. S. Cook, filed on Dec. 24, 1963, Ser. No. 333,103, now issued as Patent 3,259,899, July 5, 1966.

One of the features of the present invention is that the effect of polarization degeneracy is eliminated without resorting to the use of multiplicity of processing channels required by the system of this copending application.

For elliptically polarized signals, higher order modes are excited. However, the pointing error signals developed are inherently erroneous as a result of the cross coupling effect which is primarily a function of polarization ellipticity. Mathematical formulations of this inherent error are discused on page 1290, section 2.3 of the aforementioned Bell System Technical Journal. This cross coupling error is a consequence of the fact that, with elliptical polarization, the incident field is not a uniformly rotating constant amplitude vector. Present tracking systems, including the nondegenerate system using higher order mode sampling of the aforementioned J. S. Cook application are inherently fallible for elliptical signals. In general, this noncircular polarization causes correction to occur in a curvilinear path rather than in a straight line with a concomitant reduction in response time. Evidently, time is of the essence when one wishes to zero in on a miniscule object, thousands of miles in space, in a matter of seconds.

It is, therefore, a principal object of the present invention to improve the performance of tracking systems.

Another object is to eliminate the effect of cross coupling error in a tracking system.

Yet another object is to improve the response time of nondegenerate multimode tracking systems.

In accordance with the present invention an antenna, excitable in at least two orthogonal polarized dominant modes of propagation, for example, the horizontal and vertical components of the $TE_{11}$ mode signal, and at least two secondary higher order modes of propagation, for example, the $TE_{01}$ and $TM_{01}$ mode signals, is used to track a distant target. Sampling means are provided for developing signals representative of energy in each of these modes of propagation. One of the signal components of the dominant mode, for instance, the vertical component, is shifted in phase $\pi/2$ radians and algebraically combined in a hybrid device with its counterpart, i.e., the nonshifted dominant mode signal. Similarly, one of the higher order mode signals, for example, the $TE_{01}$, is shifted in phase $\pi/2$ radians and algebraically combined with the other higher order mode signal. As more fully described hereinafter, this combining technique of the present invention eliminates the elliptical nature of the received signal thereby substantially reducing cross coupling error. The resultant combined signals are compared in amplitude and phase to develop pointing error indications. These pointing error signals may be used for vernier or automatic positioning of the tracking system.

In addition, the sundry related apparatus of tracking systems, for example, communications receivers, often require a signal of fixed polarization preparatory to processing. In systems wherein signals of diverse polarization are received, it is mandatory that automatic measurement of the received polarization angle be made and appropriate depolarization be accomplished accordingly. Therefore, an automatic depolarizer is a feature of the tracking system of the present invention.

These and further features and objects of this invention, its nature and various advantages will appear more fully upon consideration of the attached drawings and the following detailed description of the drawings.

In the drawings:

FIG. 1 illustrates typical radiation patterns for an open-ended circular waveguide antenna;

FIG. 2 is a coordinate diagram illustrating the geometrical aspects of signal source tracking;

FIG. 4 is a schematic illustration of an automatic depolarizer suitable for use in the apparatus of FIG. 3.

Figure 3:
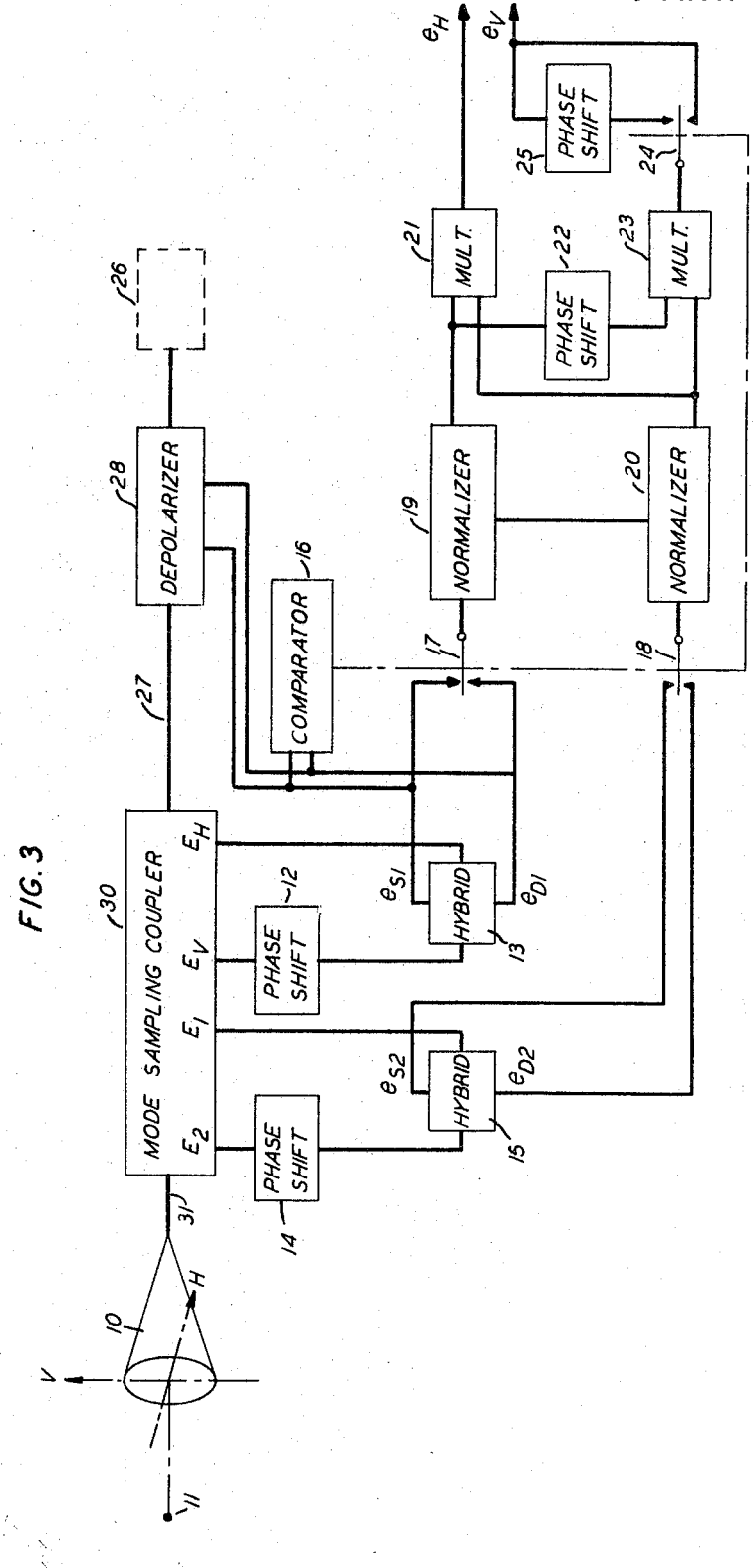
FIG. 3 is a block schematic diagram of an automatic tracking radar system in accordance with the present invention.

For automatic tracking of a target, it is sufficient that the radar apparatus deliver a signal that is of zero magnitude for a target on the antenna axis, a signal that is of one time phase when the target is off-axis in one direction, and of a magnitude proportional to the departure from it, and a signal that is of the opposite phase when the target is off the axis in the opposite direction. FIG. 1 illustrates typical radiation patterns for an open-ended circular waveguide antenna for the dominant and higher order modes, which illustrates the manner in which these modes meet this requirement. A higher order mode signal passes through a null on the antenna axis and increases in magnitude with opposite relative phase relationship for angles away from the axis in either direction.

In the present invention, the $TE_{11}$ mode is utilized as the reference or dominant mode, against which two higher order modes, the $TM_{01}$ and the $TE_{01}$, combined in accordance with the present invention, are measured.

Before entering upon a detailed description of the apparatus of the invention and of the fashion in which it operates, it will be of advantage to discuss the analytical principles which it embodies.

The incident wave E received at the antenna may be expressed as:

$$E = [A\epsilon^{j\omega t} + B\epsilon^{-j\omega t}]\epsilon^{j\gamma} \quad (1)$$

where $\omega$ is equal to the angular source frequency,

A is equal to the received amplitude of the counterclockwise or left-hand rotating electric vector, B is equal to the amplitude of the clockwise or right-hand rotating electric vector, and $\gamma$ is equal to the polarization angle relative to the horizontal.

A schematic presentation of a locus of Equation 1 is depicted in FIG. 2. The values of the coefficients of the terms in Equation 1 determine the form of polarization. When A or B is equal to zero, the signal is circularly polarized. If A is not equal to B, the signal is elliptically polarized. For linear polarization, A is equal to B. The magnitudes A and B are related to the nature of the source and vary inversely as the distance or range of the source from the antenna. The angle $\gamma$ is related to the orientation of the source relative to the antenna.

The tracking antenna delivers the received energy of the incident wave to a mode coupler where signals for tracking are separated from signals for communication.

The tracking signals are four in number and are related to the following waveguides modes:

$$TE_{11}H, TE_{11}V, TM_{01} \text{ and } TE_{01}$$

These mode signals may be analytically expressed, respectively, as:

$(TE_{11}H) \quad E_H = C_1[A \cos(\omega t + \gamma) + B \cos(\omega t - \gamma)]$ $(TE_{11}V) \quad E_V = C_1[A \sin(\omega t + \gamma) - B \sin(\omega t - \gamma)]$ (2)

$(TM_{01}) \quad E_1 = C_2\theta[A \cos(\omega t + \gamma - \varphi) + B \cos(\omega t - \gamma + \varphi)]$ $(TE_{01}) \quad E_2 = C_2\theta[A \sin(\omega t + \gamma - \varphi) - B \sin(\omega t - \gamma + \varphi)]$ The H and V axes are in a plane perpendicular to the antenna boresight axis as illustrated in FIG. 2. The first two signals, $E_H$ and $E_V$ are derived from the $TE_{11}$ or dominant mode and these two signals receive their energy in orthogonal planes, the H plane being horizontal and the V plane vertical. These signals are degenerate for linearly polarized waves, i.e., when the electric vector is maximum for $TE_{11}H$, it is minimum for $TE_{11}V$ and vice versa. The $TM_{01}$ and $TE_{01}$ signals are inherently orthogonal. Similarly, these signals are also degenerate for linearly polarized waves.

The signals of Equation 2 must be processed to develop error signals proportional to the horizontal and vertical pointing error signals:

$$e_H = \theta \cos \varphi$$
$$e_V = \theta \sin \varphi \quad (3)$$

where the error variation $\theta$ and $\varphi$ are as depicted in FIG. 2. It may be readily seen that a phase and magnitude comparison of $E_H$ and $E_V$ of Equation 2, respectively, with $E_1$ and $E_2$ would develop signals proportional to the pointing error if it were not for the presence of more than one sinusoidal term in the expressions. These excess sinusoidal terms are present as a direct result of the elliptical nature of the received signal.

In the system of the present invention, not only is this cross coupling error introduced by the elliptical nature of the signal eliminated, but simultaneously so is the effect of signal degeneracy. Thus, in accordance with the present invention, the $E_V$ signal is phase shifted $\pi/2$ radians and combined with $E_H$ in a hybrid to develop sum and difference reference signals:

$$e_{S1} = 2C_1A \cos(\omega t + \gamma)$$
$$e_{D1} = 2C_1B \cos(\omega t - \gamma) \quad (4)$$

The magnitudes and phases of these signals are independent of the pointing error for small departures of the source from the boresight axis; hence they are used as reference signals for determining the tracking error. Similarly, the $E_2$ signal is phase shifted $\pi/2$ radians and combined with $E_1$ in a hybrid to develop sum and difference error signals:

$$e_{S2} = 2C_2A\theta \cos(\omega t + \gamma - \varphi)$$
$$e_{D2} = 2C_2B\theta \cos(\omega t - \gamma + \varphi) \quad (5)$$

These error signals are essentially zero when the boresight axis of the antenna passes through the source. When a source is not on the antenna axis but is within the antenna beam, the error signals differ in phase and magnitude from the reference signals. The phase of an error signal relative to a reference signal gives the direction that the antenna boresight axis must be moved to make it coincide with the source. The magnitude of the error signal relative to the reference signal gives the angular distance that the antenna boresight axis must be moved along the radius vector. It should be noted that the two reference signals of Equation 4 need not both be used. As a matter of fact, for circular polarization, one of the signals vanishes. Since for linear or elliptical polarization, both signals are present, all conditions will be satisfied if the reference signal of greater or equal magnitude is chosen. For example, if A equals zero or is less than B, $e_{D1}$ is chosen as the reference signal. Similarly, the corresponding sum or difference error signal is simultaneously chosen for phase and magnitude comparison. The selected signals are normalized with respect to the magnitude of the reference signal chosen and multiplied with their corresponding sum or difference counterpart, to develop the following signals:

$$e_{S1} \cdot e_{S2} = K\theta \cos \varphi$$
$$e_{D1} \cdot e_{D2} = K\theta \cos \varphi \quad (6)$$

where K is related to the gain of the normalization circuitry. If the reference signal chosen is phase shifted $\pi/2$ radians, and then multiplied with its counterpart, the following signals result:

$$e_{S1} / \frac{\pi}{2} \cdot e_{S2} = -K\theta \sin \varphi$$

$$e_{D1} / \frac{\pi}{2} \cdot e_{D2} = K\theta \sin \varphi \quad (7)$$

Thus, signals proportional to the pointing error signals of Equation 3 have been developed that are free of cross coupling error and linear polarization degeneracy.

Turning now to a description of the apparatus of the present invention by which these principles are turned to account, FIG. 3 illustrates an automatic tracking system. A horn antenna 10 gathers polarized microwave signals from a tracking source 11. Illustratively, 11 is an active source such as a satellite which generates a fixed frequency tracking or beacon signal of arbitrary polarization. The source, of course, may also be a passive source such as a radar target which reflects signals generated at the tracking location. Suitable duplexer equipment placed, for example, in waveguide 31 which couples antenna 10 to sampling coupler 30 is ordinarily employed in radar applications to permit horn antenna 10 also to be used for transmitting. The duplexer protects coupler 30 from transmitted energy. In the present discussion, however, antenna 10 is assumed merely to collect the signal radiated from the source.

Coupler 30 functions to sample separately the two higher order modes and the orthogonal, i.e., vertically and horizontally polarized dominant modes excited in antenna 10 and transported to it by circular waveguide 31. It is well known that there are a series of axially symmetric higher order modes of propagation in a circular waveguide. Radiation of these modes from an open-ended guide must be zero along the projection of the waveguide axis because of the balanced nature of the fields as they appear at the guide opening. Such a center zero radiation pattern is used in the present invention as a source of pointing error information.

In a typical example, coupler 30 is arranged to deliver at one of its outputs the horizontal component of the $TE_{11}$ dominant mode, at a second of its outputs the vertical component of the dominant mode, at a third of its outputs the $TM_{01}$ mode, and at a fourth output the $TE_{01}$ mode. A suitable sampling coupler for providing the required signals is described in the aforementioned patent application of J. S. Cook.

The vertical and horizontal components of the dominant mode signal, designated for convenience $E_V$ and $E_H$, constitute the reference mode signals. The $TM_{01}$ and $TE_{01}$ signals designated $E_1$ and $E_2$ constitute the higher order mode error signals. The vertical component $E_V$ of the reference signal is phase shifted $\pi/2$ radians by phase shifter 12 and applied to hybrid 13 wherein it is algebraically combined with the horizontal component $E_H$. Resulting sum and difference signals $e_{S1}$ and $e_{D1}$ appear at the output of hybrid 13. Similarly, the higher order mode error signal $E_2$ is phase shifted $\pi/2$ radians by phase shifter 14 and algebraically combined with $E_1$ in hybrid 15 for developing error signals $e_{S2}$ and $e_{D2}$. A simple $\pi/2$ phase shifter of any form well known in the art may be used. A suitable hybrid is described in United States Patent 2,445,885, issued to W. A. Tyrrell on July 27, 1948.

Comparator 16, responsive to signals $e_{S1}$ and $e_{D1}$, compares these two signals and selects the signal which is greater than or equal to its reference counterpart. For example, if the received signal is linearly polarized the two reference signals are equal; arbitrarily, $e_{S1}$ is chosen as the reference signal. If the received signal is circularly or elliptically polarized either one or the other of the signals vanishes or is smaller than the other. Consequently, the larger reference signal is chosen for magnitude and phase comparison. The output of comparator 16 selectively operates switches 17 and 18, thereby choosing the larger signal and simultaneously selecting the corresponding sum or difference error signal $e_{S2}$ or $e_{D2}$. Advantageously, comparator 16 comprises two crystal detectors for sampling $e_{S1}$ and $e_{D1}$ and a difference amplifier. A relay sensitive to the polarity of the output of the difference amplifier operates switches 17 and 18, and as explained hereinafter, switch 24. Common amplitude variations such as path loss effects are removed from the selected reference and error signals, by normalization, and the normalized signals are then phase compared, for example, by multiplication to develop pointing error signals. Normalization networks 19 and 20 may be automatic gain control [AGC] amplifiers, or the like, and each may include, typically, a frequency converter and an intermediate frequency amplifier. Applied signals are normalized in each network with respect to the chosen reference signal. The resulting normalized error signal is then phase compared or multiplied with a normalized reference signal to develop pointing error signal $e_H$. Normalized $e_{S2}$ or $e_{D2}$, whichever appears at the output of normalizer 20 is thus applied to multiplier 21 together with the normalized $e_{S1}$ or $e_{D1}$ signal from normalizer 19. One pointing error signal component $e_H$ is thus developed at the output of multiplier 21. The other pointing error signal $e_V$ is developed by a phase comparison of $e_{S1}$ or $e_{D1}$, whichever is selected by comparator 16, shifted $\pi/2$ radians by phase shifter 22, and $e_{S2}$ or $e_{D2}$ in multiplier 23. It will be noted from Equation 7 that a sign reversal is present when the sum signals $e_{S1}$ and $e_{S2}$ are used for pointing error determination. Switch 24, which operates simultaneously with switches 17 and 18, connects a $\pi$ phase shifter 25 to the output of the multiplier 23, when the sum signals are used. The pointing error signals $e_H$ and $e_V$ thus developed may be employed, via suitable servo apparatus, to control the pointing direction of antenna 10.

Conveniently, the antenna used for tracking is simultaneously used for the reception of communication signals, that is, video or audio information. The use of two separate antennas for accomplishing this function would be both redundant and economically prohibitive. Typically, beacon, i.e., tracking signals and communication signals are of diverse frequencies and are easily separated, for example, in mode coupler 30. However, prior to signal processing, for example, in a communication receiver or other related ground station equipment illustrated schematically in FIG. 3 as device 26, the signal must be depolarized to insure compatibility with the receiving apparatus. For circular polarization, this is accomplished simply and economically by using a fixed depolarizer. In the present system, wherein signals of diverse polarization may be received, automatic measurement of the polarization angle and concomitant adjustment is required. Thus, waveguide 27 of FIG. 3 conveys communication signals to depolarizer 28 prior to processing by apparatus 26. Automatic depolarization is facilitated by the combining technique of the present invention. The output signals of hybrid 13, $e_{S1}$ and $e_{D1}$ of Equation 4, are conveniently in a form which simplifies polarization angle measurement. Evidently, the signals differ in phase by twice the value of the polarization angle. A circuit for turning to account this mathematical relationship which results from the signal combining technique of the present invention is illustrated in FIG. 4.

The depolarizer of FIG. 4, responsive to the reference signals $e_{S1}$ and $e_{D1}$ developed by hybrid 13, automatically measures the value of the polarization angle and adjusts a microwave phase shifter to compensate for any deviation from a prescribed norm. Reference signals $e_{S1}$ and $e_{D1}$ are reduced in signal frequency by frequency converters 29 and 32, respectively. Advantageously, parametric amplifiers may be used. Filters 33 and 34 remove any extraneous high frequency components present in the applied signals. The filtered signals, increased in magnitude by amplifiers 35 and 36, are applied to zero axis crossing detectors 38 and 39. For the purpose of explanation, it will be momentarily assumed that phase shifter 37 is not present in the circuit of FIG. 4. Zero axis crossing detectors are well known, and are used extensively for developing output signals when an applied signal suffers a change in relative polarity. Signals developed by detectors 38 and 39 are used to set and reset an astable multivibrator 40. Since the time differential between the zero crossings of two signals is a measurement of phase difference, the average D.C. voltage developed by multivibrator 40 at its set and reset output terminals is a measurement of the phase differential between the two signals $e_{S1}$ and $e_{D1}$. Alternating components of the multivibrator output are removed by low-pass filters 41 and 42. The combination of zero axis crossing detectors, multivibrator, and filters is commercially available as a packaged unit commonly referred to as a "phasemeter." The D.C. signal is increased by amplifier 43, prior to application to a D.C. servo motor 44. If there is a 180 degree phase difference between $e_{S1}$ and $e_{D1}$ no average D.C. output signal will be developed by multivibrator 40. However, any other phase difference will cause motor 44 to increase or decrease the phase contribution of phase shifter 37, thereby to reduce the signal of the error correcting loop to a zero or null value. Thus, when a stable condition is reached, the sum of the phase differential of $e_{D1}$ and the phase contribution of phase shifter 37 differs from $e_{S1}$ by 180 degrees. Since the phase differential of $e_{S1}$ and $e_{D1}$, Equation 4, is equal to twice the polarization angle $\gamma$, the phase contribution of phase shifter 37 is the complement of twice the polarization angle. Reduction gear apparatus 45 reverses the direction of rotation of shaft 47 and provides a two-to-one rotational reduction. The proper magnitude and direction of the rotation of microwave phase shifter 46 in the transmission path of waveguide 27 is therefore accomplished. The resultant communication signal, depolarized by phase shifter 46, may then be applied to device 26, for example, a communication receiver. In the event the received wave signal is circularly polarized, one of the reference signals will be missing, as previously explained. Therefore, the servo will drive continuously. Advantageously, the servo may be provided with an alarm system operative upon continuous rotation of the motor 44. Any other well-known device may of course be used.

It is to be understood that the embodiments shown and described herein are illustrative and that further modifications of this invention may be implemented by those skilled in the art without departing from the scope and spirit of the invention. For example, the system of the present invention may be provided with time division switching apparatus to process the error and reference signals in a unitary channel utilizing a phase lock loop, for example, of the type described in volume 42 of the Bell System Technical Journal, 1963, by W. L. Nelson, on page 1941.

What is claimed is:

1. A system for determining the position of the source of a signal of arbitrary polarization comprising, in combination;

a directional antenna system including a single electromagnetic wave element receptively excitable in at least two orthogonally polarized dominant modes of propagation and at least two secondary modes of propagation, means for developing mode signals representative of the energy received in said wave element in each one of said modes of propagation, means for shifting the phase, respectively, of one of said dominant mode signals and one of said secondary mode signals $\pi/2$ radians, means for algebraically combining, respectively, said phase shifted signals with their dominant and secondary mode counterparts, means for comparing the phase and amplitude of said combined secondary mode signal with the phase and amplitude of said combined dominant mode signal, and means for utilizing signals developed by said comparison as an indication of the position of said source with respect to said antenna system.

2. A system as defined in claim 1 wherein said dominant mode is of the $TE_{11}$ type.

3. A system as defined in claim 1 wherein said dominant mode is of the $TE_{11}$ type and said secondary modes are of the $TM_{01}$ and $TE_{01}$ type.

4. A tracking system of the simultaneous lobe comparison type which comprises, means for receiving a signal of arbitrary polarization, means for propagating said received signal, means for sampling said signal to develop therefrom a pair of quadrature component signals of a dominant propagating mode and signals excited in at least two higher propagating modes, means for selectively combining said dominant component signals, means for selectively combining said higher order mode signals, and means for comparing said combined signals to develop product signals that represent the direction of the source of said arbitrarily polarized signal with respect to said tracking system.

5. A tracking system which comprises, means for receiving a signal of arbitrary polarization, means for sampling said signal to develop therefrom a pair of substantially orthogonal signals of a dominant propagating mode and signals of at least two higher order propagating modes, means for phase shifting one of said dominant mode signals, means for phase shifting one of said higher order mode signals, means for algebraically combining said phase shifted dominant mode signal and its unshifted dominant mode counterpart, means for algebraically combining said phase shifted higher order mode signal and its unshifted higher order mode counterpart, means for individually normalizing said combined signals with respect to said combined dominant mode signal, and means for forming the product of said normalized combined signals thereby developing signals indicative of the position of a source of said arbitrarily polarized signal with respect to said tracking system.

6. A tracking antenna system which comprises, in combination;

means for receiving an arbitrarily polarized signal, means for propagating said received signal, means for developing mode signals representative of the orthogonal components of the dominant propagating mode of said received signal and two higher order propagating modes, means for shifting the phase of one of said dominant mode components and one of said higher order mode signals, means for developing sum and difference signals, respectively, of said phase shifted signals with their dominant and higher order mode signal counterparts, means for selecting the dominant sum or difference signal, whichever is greater in magnitude, as a reference signal, means for simultaneously selecting the corresponding sum or difference higher order signal as an error signal, means for normalizing said selected signals with respect to the magnitude of said reference signal, means for forming the product of said normalized reference and error signals to develop a first pointing error signal, means for shifting the phase of said normalized reference signal, and means for forming the product of said phase shifted normalized reference signal and said error signal to develop a second pointing error signal.

7. A multimode tracking system which comprises, in combination;

means respective to incident waves of arbitrary polarization, means for sampling said incident wave to develop two substantially orthogonal dominant mode signals and at least two higher order mode signals, means for shifting the phase, respectively, of one of said dominant components and one of said higher mode components, means for additively and subtractively combining said shifted and unshifted dominant components to develop reference sum and difference signals, means for additively and subtractively combining said shifted and unshifted higher order components to develop sum and difference error signals, means for selecting the sum or difference reference signal which is greater than or equal to its reference counterpart, means for simultaneously selecting the corresponding sum or difference error signal, means for normalizing said selected reference and error signals with respect to the magnitude of said selected reference signal, and means for comparing the phase and magnitude of said normalized reference and error signals to develop pointing error signal indications.

8. A microwave system for simultaneously processing tracking and communication signals comprising, in combination;

means for simultaneously receiving tracking and information bearing signals of arbitrary polarization, means for sampling said tracking signal to develop two substantially orthogonal dominant mode signals and at least two higher order mode signals, means for combining, respectively, said dominant mode signals and said higher order mode signals to develop reference and error sum and difference signals, means responsive to said reference and error signals for developing pointing error signals, and means responsive to said reference sum and difference signals for depolarizing said information bearing signal.

9. A microwave system as defined in claim 8 wherein said combining means comprises, means for shifting the phase of one of said dominant mode signals and one of said higher order mode signals, means for forming the sum and difference of said phase shifted dominant mode signal and its unshifted counterpart, and means for forming the sum and difference of said phase shifted higher order mode signal and its unshifted higher order mode counterpart.

10. A microwave system as defined in claim 8 wherein said depolarizing means comprises, means for developing a signal representative of the phase differential of said reference sum and difference signals, means responsive to said differential signal for altering the phase of one of said reference signals an increment correspoding to said phase differential, and means responsive to said altering means for shifting the phase of said information bearing signal one-half the value of said increment.

11. A communications system receptive to microwave beacon and communication signals comprising, in combination;

means for developing mode signals representative of the energy received in two polarized dominant modes of propagation and at least two secondary modes of propagation of said beacon signal, means for shifting the phase, respectively, of one of said dominant mode signals and one of said secondary mode signals $\pi/2$ radians, means for additively and subtractively combining, respectively, said phase shifted signals with their dominant and secondary mode counterparts, means for comparing the phase and amplitude of said combined secondary mode signals with the phase and amplitude of said combined dominant mode signals to develop pointing error signals, means responsive to said combined dominant mode signals for developing a signal representative of the difference in phase of said additively and subtractively combined dominant mode signals, means responsive to said representative difference signal for reducing said phase difference to a null value, and means responsive to said reducing means for shifting the phase of said communication signal an increment corresponding to one-half the value of that necessary to reduce said phase difference to a null value.

12. A communications antenna system of the multimode type comprising, in combination;

means responsive to tracking and communication signals of arbitrary polarization propagated by a distant source, means for developing quadrature dominant mode signals and at least two higher order mode signals of said propagated tracking signal, means responsive to said mode signals for developing reference signals and error signals, means responsive to said reference signals for depolarizing said propagated communication signal, and means responsive to said reference and error signals for developing pointing error signals indicative of the position of said source with respect to said antenna system.

13. A communications antenna system as defined in claim 12 wherein said means for developing said reference and error signal comprises, first means responsive to said quadrature dominant mode signals for developing sum and difference reference signals, and second means responsive to said higher order mode signals for developing sum and difference error signals.

14. A communications antenna system as defined in claim 13 wherein said first means comprises, means for shifting the phase of one of said dominant mode signals $\pi/2$ radians, and hybrid means for algebraically combining said phase shifted dominant mode signal and its unshifted counterpart.

15. A communications antenna system as defined in claim 13 wherein said second means comprises, means for shifting the phase of one of said higher order mode signals $\pi/2$ radians, and hybrid means for algebraically combining said phase shifted higher order mode signal and its unshifted counterpart.

16. A communications antenna system as defined in claim 12 wherein said depolarizing means comprises, mean for converting the frequency of said reference signals to a selected frequency range,
- means for developing signals representative of the zero axis crossings of said converted reference signals,
- means for developing signals representative of the time differential between said zero crossings,
- means responsive to said representative signals for altering the phase of one of said reference signals thereby to reduce said differential to a null value,
- and means responsive to said altering means for simultaneously shifting the phase of said communication signal an increment corresponding to one-half the value of that necessary to reduce said differential to a null value.

References Cited by the Applicant

UNITED STATES PATENTS 333,103  12/1963  Cook.

OTHER REFERENCES

Bell System Technical Journal, vol. 42, "The Autotrack System," p. 1283, by J. S. Cook and R. Lowell, July 1963.

Bell System Technical Journal, vol. 42, "Phase-Lock Loop Design for Coherent Angle-Error Detection in the Telstar Satellite Tracking System," p. 1941, by W. L. Nelson, Sept. 1963.

CHESTER L. JUSTUS, *Primary Examiner.*

C. E. WANDS, *Assistant Examiner.*